US008565290B2

(12) United States Patent
Nentwig

(10) Patent No.: US 8,565,290 B2
(45) Date of Patent: Oct. 22, 2013

(54) METHOD AND APPARATUS FOR LATENCY-AWARE SCHEDULING USING INTERFERENCE CANCELLATION

(75) Inventor: Markus Nentwig, Helsinki (FI)

(73) Assignee: Nokia Corporation, Espoo (FI)

( * ) Notice: Subject to any disclaimer, the term of this patent is extended or adjusted under 35 U.S.C. 154(b) by 747 days.

(21) Appl. No.: 12/620,397

(22) Filed: Nov. 17, 2009

(65) Prior Publication Data

US 2011/0116532 A1 May 19, 2011

(51) Int. Cl.
H04B 1/38 (2006.01)

(52) U.S. Cl.
USPC ........... 375/219; 375/223; 375/259; 375/271; 375/295; 375/316

(58) Field of Classification Search
USPC ......... 375/219, 223, 259, 271, 295, 316, 322, 375/344, 346, 347, 299
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 7,738,529 B2 * | 6/2010 | Horiguchi | ..................... | 375/133 |
| 8,018,907 B2 * | 9/2011 | Kubler et al. | ................ | 370/338 |
| 8,340,580 B1 * | 12/2012 | Epstein | ........................ | 455/63.1 |
| 8,351,522 B2 * | 1/2013 | Maltsev et al. | ............... | 375/260 |
| 2001/0040874 A1 * | 11/2001 | Saito et al. | .................... | 370/282 |
| 2003/0169746 A1 * | 9/2003 | Kitazawa et al. | ........ | 370/395.42 |
| 2009/0069023 A1 * | 3/2009 | Ahn et al. | ...................... | 455/450 |
| 2009/0252099 A1 * | 10/2009 | Black et al. | ................... | 370/329 |
| 2011/0032887 A1 * | 2/2011 | Kishiyama et al. | ........... | 370/329 |
| 2011/0051684 A1 * | 3/2011 | Li et al. | .......................... | 370/331 |
| 2011/0103530 A1 * | 5/2011 | Luo et al. | ....................... | 375/346 |
| 2011/0195704 A1 * | 8/2011 | Choi et al. | ..................... | 455/423 |
| 2012/0026948 A1 * | 2/2012 | Ogawa et al. | ................. | 370/329 |

OTHER PUBLICATIONS

"LTE-Advanced Autonomous CC selection results for dense urban", 3GPP TSG RAN WG1 #58bis Meeting, Japan, Miyazaki, Oct. 12-16, 2009.

* cited by examiner

Primary Examiner — Hirdepal Singh
(74) Attorney, Agent, or Firm — Mintz, Levin, Cohn, Ferris, Glovsky & Popeo, P.C.

(57) ABSTRACT

In accordance with an example embodiment of the present invention, there is provided an apparatus comprising transceiver circuitry configured to obtain a data unit received over an air interface, the air interface comprising first and second radio resources, logic circuitry configured to determine whether the data unit was received over the first radio resources or the second radio resources and responsive to a determination that the data unit was received over the first radio resources, process the data unit without interference cancellation and responsive to a determination that the data unit was received over the second radio resources, process the data unit using interference cancellation.

18 Claims, 5 Drawing Sheets

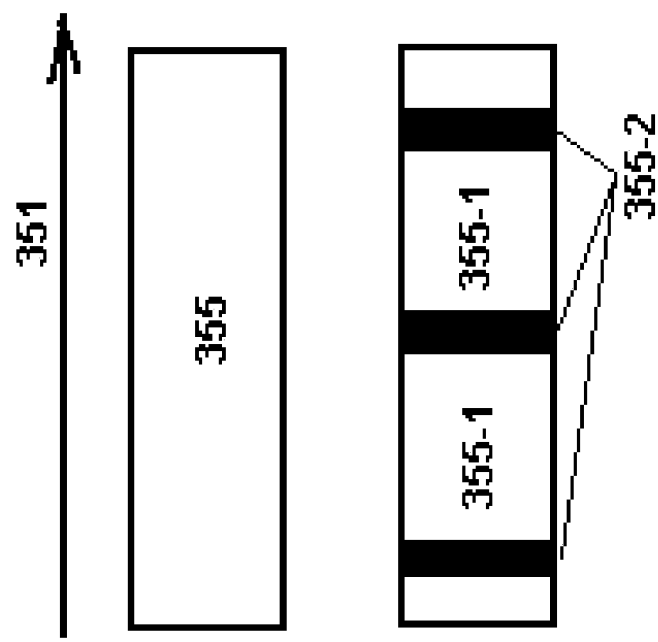
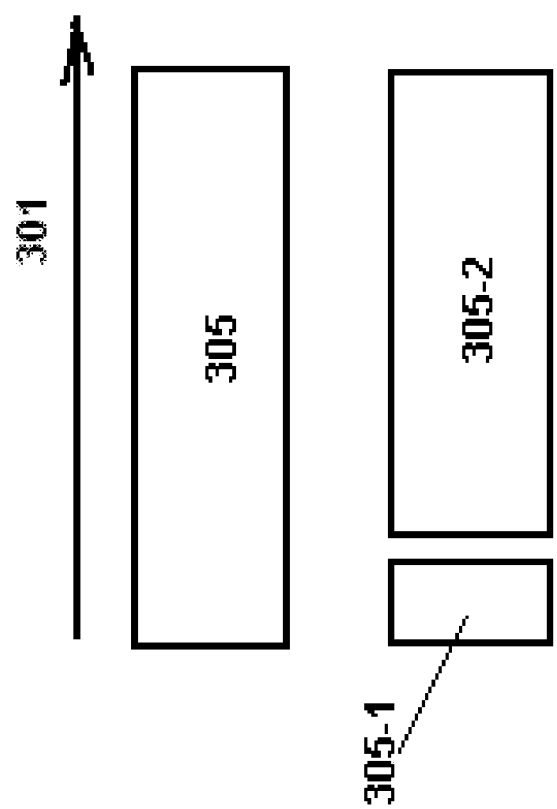
Fig. 3b
Fig. 3a

METHOD AND APPARATUS FOR LATENCY-AWARE SCHEDULING USING INTERFERENCE CANCELLATION

TECHNICAL FIELD

The present application relates generally to scheduling data units to radio resources and to interference cancellation.

BACKGROUND

Radio communication systems, for example cellular communication systems, employ various methods to control interference caused by simultaneously communicating users. Finite radio resources may be managed so that individual users are allocated a subset of the total available resources to provide simultaneous multiple user access. The resource subsets allocated to different users may be separated from each other by separating them in frequency, which is known as frequency division multiple access or FDMA. They may also be separated in the time domain, which is known as time division multiple access or TDMA. They may also be separated using spreading codes, which technique is known as code division multiple access or CDMA. They may also be separated using orthogonal subcarriers, which is known as OFDMA. In systems permitting directional transmission radio resources may also be partitioned in the space domain, which is known as space division multiple access or SDMA. Combinations of techniques are employed, for example a spreading code or frequency band may be time-sliced between a plurality of users.

Besides avoiding interference by partitioning radio resources, performance of radio communication systems may be improved by introducing interference cancellation, IC, techniques. An IC receiver demodulates at least one interfering signal in addition to the signal of interest, for the purpose of cancelling the interfering signal from the signal of interest to improve a signal-to-noise ratio.

SUMMARY

A side-effect of employing interference cancellation is that delay is introduced into the demodulation and reception process in a receiver. The length of the delay may depend on how long an IC enabled receiver buffers the signal of interest and the interfering signal before performing cancellation, and/or an amount of processing time needed to perform an interference cancelling operation. According to aspects of various example embodiments of the invention, delay-sensitive traffic is processed without interference cancellation and delay-insensitive traffic is processed using interference cancellation.

According to a first aspect of the present invention, there is provided an apparatus, comprising transceiver circuitry configured to obtain a data unit received over an air interface, the air interface comprising first and second radio resources, logic circuitry configured to determine whether the data unit was received over the first radio resources or the second radio resources and responsive to a determination that the data unit was received over the first radio resources, process the data unit without interference cancellation and responsive to a determination that the data unit was received over the second radio resources, process the data unit using interference cancellation.

According to a second aspect of the present invention there is provided a method, comprising obtaining a data unit received over an air interface, the air interface comprising first and second radio resources, determining whether the data unit was received over the first radio resources or the second radio resources, responsive to a determination that the data unit was received over the first radio resources, processing the data unit without interference cancellation and responsive to a determination that the data unit was received over the second radio resources, processing the data unit using interference cancellation.

According to further aspects of the invention, there are provided methods to partition a radio resource to first and second radio resources responsive to a determined need. The determined need may comprise a determination that a level of interference is either approaching a threshold value, or has exceeded a threshold value.

BRIEF DESCRIPTION OF THE DRAWINGS

For a more complete understanding of example embodiments of the present invention, reference is now made to the following descriptions taken in connection with the accompanying drawings in which:

FIG. 3a illustrates an example embodiment where radio resources are partitioned in the frequency domain.

FIG. 3b illustrates an example embodiment where radio resources are partitioned in the time domain

DETAILED DESCRIPTION OF THE DRAWINGS

An example embodiment of the present invention and its potential advantages are understood by referring to FIGS. 1 through 5 of the drawings.

Figure 1:
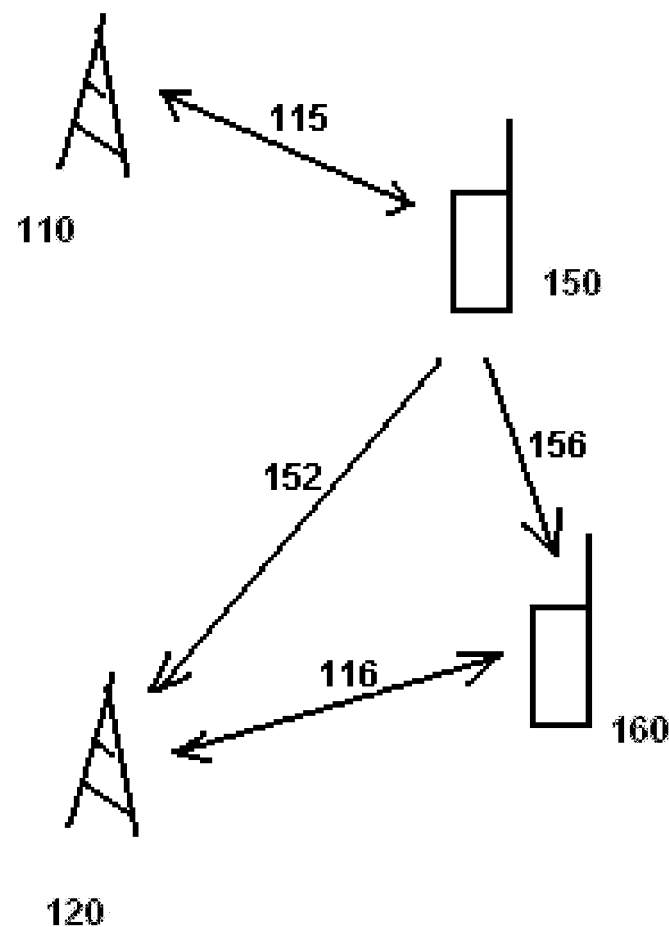
FIG. 1 illustrates an example network embodiment capable of supporting the present invention.

FIG. 1 illustrates an example network embodiment capable of supporting the present invention. Illustrated are base stations 110 and 120, which may be, for example, cellular base stations, wireless access points or the like. Illustrated are also mobile units 150 and 160, which may be, for example, mobile phones, PDAs, wireless laptop modules or similar units. Mobile unit 150 is in communication with base station 110 via a radio link 115. Mobile unit 160 is in communication with base station 120 via radio link 116. The radio link 115 may comprise separate radio resources for communication from the base station 110 to the mobile unit 150, known as downlink, and for communication from the mobile unit 150 to the base station 110, known as uplink. Similarly the radio link 116 may comprise separate radio resources for downlink and uplink. Downlink and uplink radio resources may be separated from each other in at least one of frequency, time, spreading-code or space domains.

The base stations 110 and 120 may correspond to radio communication system cells. In detail, they may correspond to so-called pico- or femtocells where the cells cover a very limited area, for example indoors. In other embodiments, the cells may be substantially larger corresponding to, for example, global system for mobile communication, GSM, cells in size. Networks comprising small cells may rely on self-organization and self-optimization of use of radio resources, whereas networks comprising larger cells may rely on centrally planned frequency planning to utilize radio resources effectively. Networks comprising both small and large cells may use combinations of self-organizing and centrally planned approaches. In self-organizing networks, cells may communicate with each other and/or cognitively share the available radio resources, for example depending on instantaneous load in particular cells. With cognitive sharing it may be meant that a node, for example a base station such as base station 110 or 120, detects radio resources which are not in use and allocates them for use in the corresponding cell. The radio resources may comprise, for example, frequency bands, timeslots and/or spreading codes. Self-organization may allow a network or group of cells to dynamically adapt to changing patterns of load or interference, to serve users more effectively than a centrally managed network could.

When receiving signals from the mobile unit 160, the base station 120 may also receive a signal from the mobile unit 150, illustrated as arrow 152 in FIG. 1. The signal received in base station 120 is thus a combination of signals 116 and 152. In case base station 120 employs interference cancellation, it may demodulate both signals 116 and 152 and cancel at least in part the effect of signal 152 from the received combination of signal 116 and signal 152. When receiving signals from the base station 120, the mobile unit 160 may similarly receive a combination of signal 116 from the base station 120 and signal 156 originating from the mobile unit 150. In case the mobile unit 160 employs interference cancellation, it may demodulate both signals 116 and 156 and cancel at least in part the effect of signal 156 from the received combination of signal 116 and signal 156. Although not illustrated in FIG. 1, also base station 110 may be a source of an interfering signal received in base station 120 and/or mobile unit 160. The system may also comprise a larger number of base stations and/or mobile units than illustrated.

According to example embodiments of the present invention, radio link 115 and/or 116 are partitioned to first and second radio resources comprising first uplink radio resources and second uplink radio resources, and first downlink radio resources and second downlink radio resources. Taking account of delay incurred in performing interference cancellation, the first radio resources uplink and downlink may be reserved for delay-sensitive traffic such as, for example, voice over internet protocol, VoIP, packets or control signals. Second radio resources uplink and downlink may be used for traffic which is not sensitive to delay, such as traffic generated from file sharing or web browsing. By employing a system as described, benefits of interference cancellation may be obtained for traffic less sensitive to delay, and low delay may be achieved for traffic which is more sensitive to delay.

Although embodiments of the invention are described herein as being partitioned to first and second radio resources, the invention is not limited thereto. Radio resources may be partitioned to, for example, three or four radio resources. For example, in case three radio resources are defined the system may be configured to use interference cancellation with long processing delay, and correspondingly high yield, for the most delay-critical data on first resources and interference cancellation with a shorter processing delay, and correspondingly lower yield, for data that has intermediate delay sensitivity on second resources, and lastly the third resources may be reserved for data with low or no delay sensitivity.

Partitioning radio resources into first and second radio resources may be effected by the mobile units 150 and 160, the base stations 110 and 120 or radio network controllers which are not illustrated in FIG. 1 but may be present in various network embodiments. In self-organizing networks, the base stations and mobile units may collaboratively determine a need to effect a partitioning of radio resources and perform the partitioning autonomously without instruction from network control entities. In an example embodiment, a base station or mobile unit may determine that interference in a cell has reached or approaches a level where use of interference cancellation would be needed. If in this situation there is delay-sensitive traffic, the radio resources may be partitioned into first and second radio resources, and delay-sensitive traffic may be transmitted and received on the first radio resources, without using interference cancellation. Traffic less sensitive to delay may then be transmitted and received using the second radio resources, using interference cancellation. The radio resources may also be partitioned in case there is no current delay-sensitive traffic, to prepare for a situation where delay-sensitive traffic occurs.

In some example embodiments, traffic less sensitive to delay that is to be transmitted using the second radio resources may be encoded in a way that is optimized for reception using interference cancellation. In some example embodiments, a node such as a base station may transmit a beacon signal to reserve at least the first radio resources for its exclusive use. Upon receiving a beacon signal from another base station, a base station may react by moving its first radio resources so that they do not overlap with resources corresponding to the beacon signal. A base station or access point may negotiate with other nearby base stations or access points to agree a temporary reservation of a radio resource, by means of signaling. In some example embodiments, base stations or access points 110 and 120 may exchange signaling with mobile units 150, 160 whereby the mobile units 150, 160 disclose whether they are capable of employing interference cancellation. Partitioning of radio resources may be undertaken at least in part responsive to determining in the base stations or access points 110, 120 that some mobile units 150, 160 within the respective cells are capable of employing interference cancellation.

Figure 2:
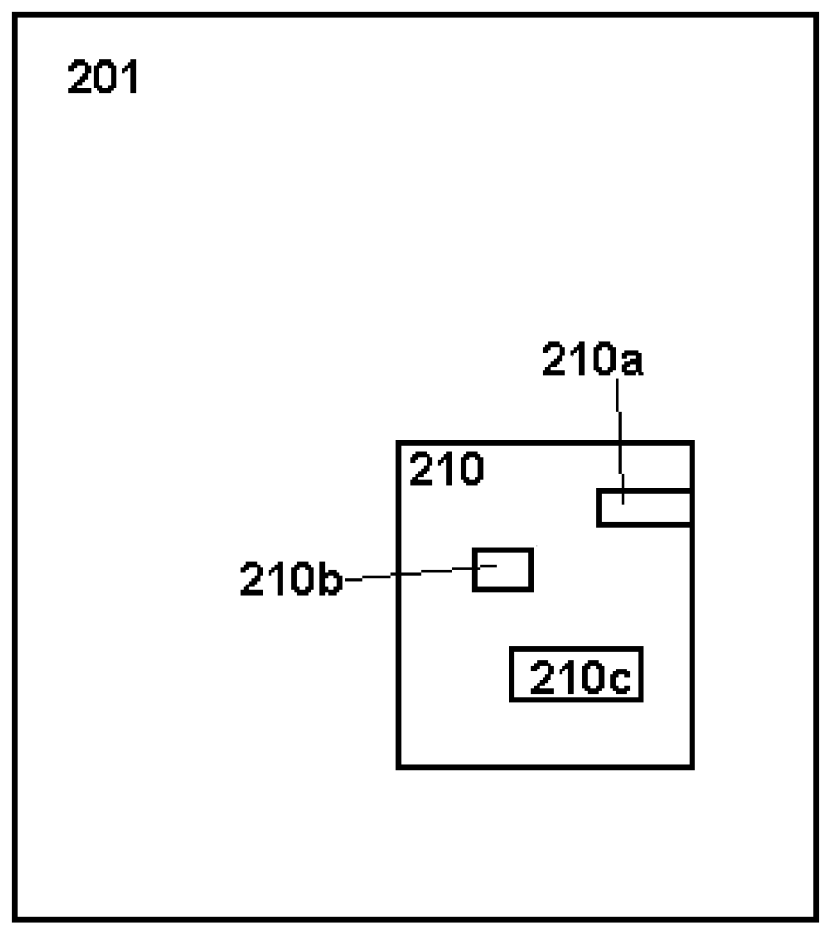
FIG. 2 illustrates an example embodiment of an apparatus capable of supporting the present invention.

FIG. 2 depicts an example apparatus 201 capable of supporting embodiments of the present invention. The apparatus may correspond to mobile node 110 of FIG. 1 or, for example, an access point or base station or a wireless communication system. The apparatus is a physically tangible object, for example a cellular telephone, personal digital assistant, laptop, portable multimedia computer or other mobile apparatus. The apparatus may comprise a control apparatus 210, for example a digital signal processor (DSP), processor, field-programmable gate array (FPGA), application-specific integrated circuit (ASIC), chipset or controller. The apparatus may further comprise transceiver circuitry 210a configured to cause the apparatus 201 to communicate with another apparatus. The apparatus may comprise memory 210b configured to store information, for example information relating to a threshold value of a delay requirement. The memory may be solid-state memory, dynamic random access memory (DRAM), magnetic, holographic or other kind of memory. The apparatus may comprise logic circuitry 210c configured to access the memory 210b and control the transceiver circuitry 210a. The logic circuitry 210c may be implemented as software, hardware or a combination of software and hardware. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transceiver circuitry 210a. The transceiver circuitry 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transceiver circuitry 210a, memory 210b and logic circuitry 210c may be comprised in the apparatus as hardware elements such as integrated circuits or other electronic components. The same applies if the apparatus 201 does comprise a control apparatus 210 but some, or all, of the transceiver circuitry 210a, memory 210b and logic circuitry 210c are not comprised in the control apparatus 210.

Radio link 115 and/or 116 of FIG. 1 may be partitioned into first and second radio resources separated from each other in at least one of frequency, time, spreading-code, space domains or orthogonal carriers. Separating in frequency domain may involve splitting a frequency band or bands into sub-bands to form the first and second radio resources. FIG. 3a illustrates an example embodiment where radio resources are partitioned in the frequency domain. Arrow 301 labels a frequency axis. Block 305 corresponds to unpartitioned radio resources, in this embodiment a frequency band used uplink or downlink. In the lower part of FIG. 3a, the frequency band is partitioned into sub-bands 305-1 and 305-2. Band 305-1 may correspond to first radio resources intended for traffic more sensitive to delay, and band 305-2 may correspond to second radio resources intended for traffic less sensitive to delay. In the illustrated embodiment, the first radio resources 305-1 are more limited than the second radio resources 305-2, however the invention is not limited thereto and the partitioning of the radio resources 305 may be undertaken in any appropriate fashion. In certain example embodiments, the ratio of the volume of traffic more sensitive to delay to the volume of traffic less sensitive to delay is used to determine the split ratio. In further example embodiments, the split ratio may be adjusted responsive to the ratio changing over time. Separating radio resourced in time domain may involve time-slicing a radio resource so that traffic is not sent on the first and second radio resources at the same time. FIG. 3b illustrates an example embodiment where radio resources are partitioned in the time domain. In FIG. 3b, arrow 351 denotes a time axis. Block 355 corresponds to unpartitioned radio resources, in this example embodiment a time frame or time slot conveying traffic uplink or downlink. In the lower part of FIG. 3b, the time frame or slot is partitioned into first radio resources 355-1 and second radio resources 355-2, both constituting sub-frames or sub-slots of the unpartitioned radio resources 355. Also in this example embodiment, the ratio of first radio resources 355-1 to the second radio resources 355-2 may depend on the ratio of the volumes of available traffic more sensitive to delay and less sensitive to delay.

Separating in spreading code domain may involve assigning orthogonal or pseudo-orthogonal spreading codes as first and second radio resources, such that traffic conveyed on the first and second radio resources is recoverable by correlating using the appropriate spreading code in the receiver. Separating in space domain may involve directional transmission and/or reception, such that transmissions on first and second radio resources are separated in radio path geometries. Radio resources may also be separated using orthogonal subcarriers, which is known as orthogonal frequency division multiple access, or OFDMA. Combinations of separating methods may be employed depending on the implementation.

Figure 4:
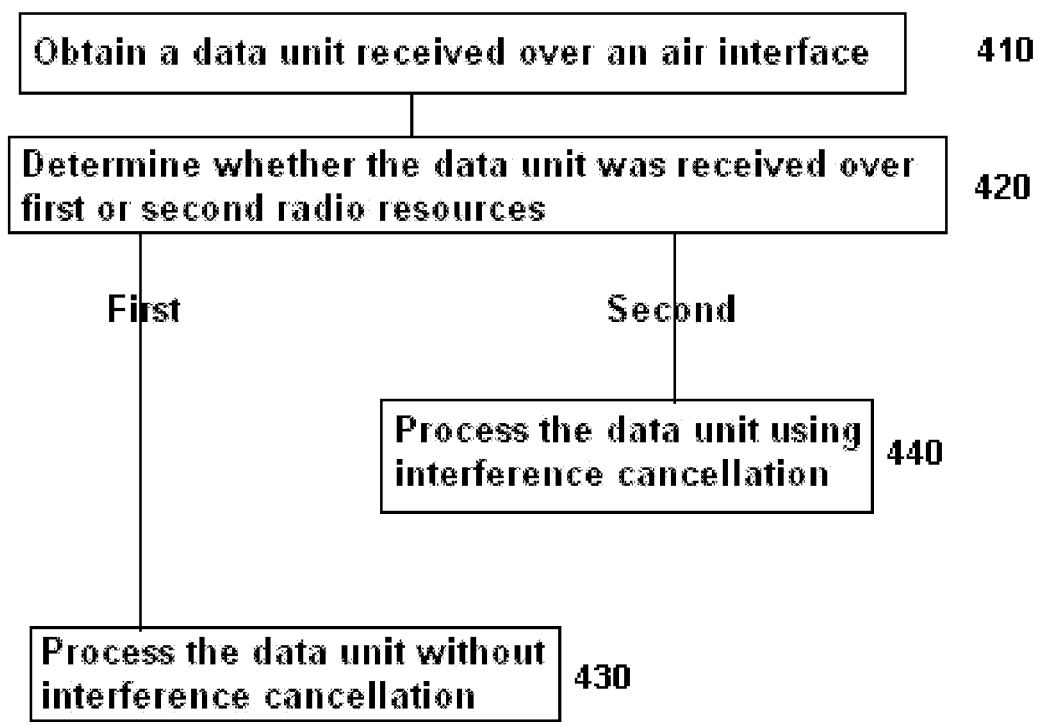
FIG. 4 illustrates an example embodiment of a reception method according to the invention.

FIG. 4 illustrates an example embodiment of a reception method according to the invention. In block 410, a data unit is obtained in an apparatus such as a base station or mobile unit, for example. The obtaining may occur in a processor or control apparatus 210 of a base station or mobile node. The data unit may have been received over an air interface comprising first and second radio resources. The first radio resources may be used for traffic more sensitive to delay and the second radio resources may be used for traffic less sensitive to delay. In block 420, it is determined if the data unit was received over the first radio resources or the second radio resources. If it is determined that the data unit was received over the first radio resources, the method proceeds to block 430. In block 430, the data unit is processed without employing interference cancellation. Processing may comprise demodulation and decoding, for example. If it is determined in block 420 that the data unit was received over the second radio resources, the method proceeds from block 420 to block 440. In block 440, the data unit is processed using interference cancellation.

Figure 5:
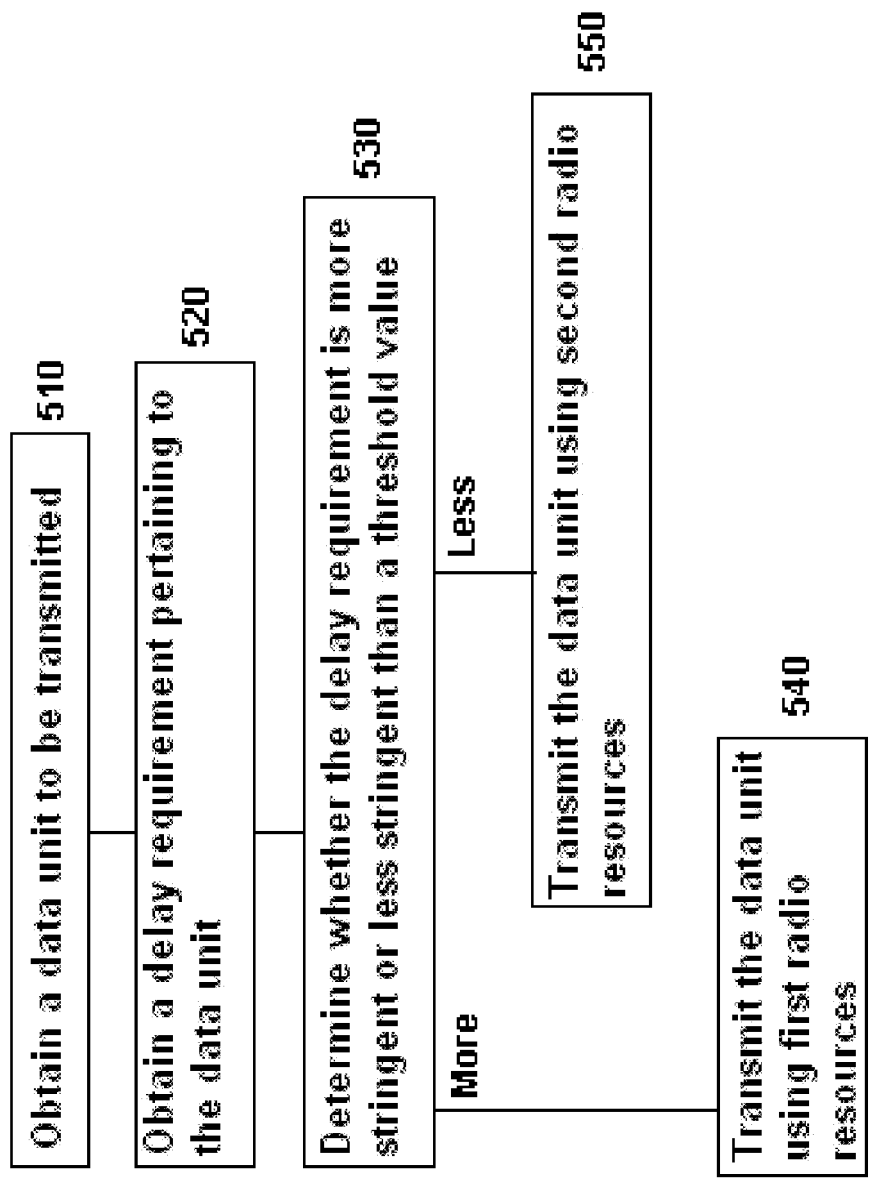
FIG. 5 illustrates an example embodiment of a transmission method according to the invention.

FIG. 5 illustrates an example embodiment of a transmission method according to the invention. In block 510, a data unit is obtained in an apparatus such as a base station or mobile unit, for example. The obtaining may occur in a processor or control apparatus 210 of a base station or mobile node. The data unit may be obtained, for example, by receiving speech via a microphone of a mobile communication device. In block 520 a delay requirement pertaining to the data unit is obtained. The delay requirement may be obtained, for example, by analyzing a traffic class of the data packet. The data packet may belong to a stream of packets. A delay requirement pertaining to all data packets belonging to a certain stream of packets may be obtained from memory 210b of an apparatus. In some embodiments, a delay requirement may be derived from the type of the data packet. For example control packets, transmission control protocol acknowledgement packets, transmission control protocol synchronization and/or voice over internet protocol packets may be considered to have stringent delay requirements. In block 530 it is determined, if the delay requirement is more or less stringent than a threshold value. The threshold value may be stored in memory 210b, for example. In some embodiments, the threshold value may be adapted over time, based on changing traffic conditions such as a frequency of arriving data packets and/or capacity available on first and second radio resources. In some embodiments, the threshold is adapted based on the amount of unused capacity on the primary resources. In some embodiments, the threshold is adapted to maximize the amount of data transmitted on the first radio resource within a limited capacity of the first radio resource. In some embodiments, the determination whether the delay requirement is more stringent or less stringent than a threshold value is based on a probabilistic, non-deterministic and/or fuzzy-logic process. In some example embodiments, the delay requirement is not a continuous variable but a discrete indicator of urgency. In these embodiments, data packets indicated as urgent are considered to have a delay requirement that is more stringent than a threshold value. If the delay requirement is determined to be more stringent than the threshold value, the method proceeds to block 540. In block 540, the data packet is caused to be transmitted using the first radio resources. If the delay requirement is determined to be less stringent than the threshold value, the method proceeds to block 550. In block 550, the data packet is caused to be transmitted using the second radio resources. Optionally in some embodiments, the data packet is encoded in a way that is optimized for reception using interference cancellation, before it is caused to be transmitted using the second radio resources. This means adapting the data packet encoding process so that a receiver employing interference cancellation may obtain a larger benefit from the interference cancellation procedure. In some embodiments, data packets are encoded into a plurality of data streams that are superimposed before transmission in order to optimize encoding for reception using interference cancellation. Individual data streams may require a varying level of signal-tonoise ratio for decoding, and a receiver may be able to perform interference cancellation on a subset of superimposed data streams.

Computer programs may be configured to cause the methods illustrated in FIG. 4 and FIG. 5, or other methods within the scope of the present document, to be performed. Such computer programs may be embodied on computer-readable storage media. Such computer programs may also be embodied in computer-readable transmitted signals.

Without in any way limiting the scope, interpretation, or application of the claims appearing below, a technical effect of one or more of the example embodiments disclosed herein is that for packets that are not sensitive to delay, interference cancellation may provide increased receiver performance while allowing delay-sensitive packets to bypass interference cancellation by transmitting them over a dedicated set of radio resourced. Another technical effect of one or more of the example embodiments disclosed herein is that interference cancellation may be taken into use responsive to a need to do so, which may yield better delay performance in low-traffic conditions when interference cancellation is not needed.

Embodiments of the present invention may be implemented in software, hardware, application logic or a combination of software, hardware and application logic. The software, application logic and/or hardware may reside in memory, processor or processors or integrated circuits. If desired, part of the software, application logic and/or hardware may reside in electronic components, part of the software and/or application logic may reside on computer-readable storage media, and part of the software and/or application logic may reside in computer-readable signals. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   transceiver circuitry configured to obtain a first data unit received over an air interface, the air interface comprising first and second radio resources;
   logic circuitry configured to determine whether the first data unit was received over the first radio resources or the second radio resources;
   the logic circuitry further configured to, when a determination indicates the first data unit was received over the first radio resources, process the first data unit without interference cancellation; and
   the logic circuitry further configured to, when the determination indicates the first data unit was received over the second radio resources, process the first data unit using interference cancellation,
   wherein the first and second radio resources are separated in at least one of a frequency domain, a time domain, and a space domain.

2. The apparatus according to claim 1, wherein
   the logic circuitry is further configured to obtain a second data unit to be transmitted, to obtain a delay requirement pertaining to the second data unit, responsive to the delay requirement being more stringent than a delay threshold value, to cause the transceiver circuitry to cause the second data unit to be transmitted using the first radio resources, and responsive to the delay requirement being less stringent than the delay threshold value, to cause the transceiver circuitry to cause the second data unit to be transmitted using the second radio resources.

3. The apparatus according to claim 2, wherein responsive to the delay requirement being less stringent than the delay threshold value, the logic circuitry is further configured to encode the second data unit to be transmitted, or cause the second data unit to be transmitted to be encoded, for interference cancellation at a receiver.

4. The apparatus according to claim 1, wherein the logic circuitry is further configured to cause a radio resource to be partitioned into first radio resources and second radio resources.

5. The apparatus according to claim 4, wherein the logic circuitry is configured to cause the radio resource to be partitioned, when interference in a cell is one of approaching an interference threshold level or has exceeded the interference threshold level.

6. The apparatus according to claim 4, wherein the logic circuitry is further configured to cause an adjustment in a partitioning of the radio resource responsive to determining that a ratio of delay-sensitive to delay-insensitive traffic has changed.

7. A method, comprising:
   obtaining a first data unit received over an air interface, the air interface comprising first and second radio resources;
   determining whether the first data unit was received over the first radio resources or the second radio resources;
   processing the first data unit without interference cancellation, when the determining indicates the first data unit was received over the first radio resources; and
   processing the first data unit using interference cancellation, when the determining indicates the first data unit was received over the second radio resources,
   wherein the first and second radio resources are separated in at least one of a frequency domain, a time domain, and a space domain.

8. The method according to claim 7, further comprising:
   obtaining a second data unit to be transmitted;
   obtaining a delay requirement pertaining to the second data unit;
   responsive to the delay requirement being more stringent than a delay threshold value, causing the second data unit to be transmitted using first radio resources; and responsive to the delay requirement being less stringent than the delay threshold value, causing the second data unit to be transmitted using second radio resources.

9. An apparatus, comprising:
at least one processor; and
at least one memory including computer program code,
the at least one memory and the computer program code configured to, with the at least one processor, cause the apparatus to perform at least the following:
obtaining a first data unit to be transmitted;
obtaining a delay requirement pertaining to the first data unit;
responsive to the delay requirement being more stringent than a delay threshold value, transmitting the first data unit using first radio resources; and
responsive to the delay requirement being less stringent than the delay threshold value, transmitting the first data unit using second radio resources,
wherein the first and second radio resources are separated in at least one of a frequency domain, a time domain, and a space domain.

10. The apparatus according to claim 9, wherein the at least one memory and the computer program code are configured to, with the at least one processor, cause the apparatus to further perform at least the following:
obtaining a second data unit from an air interface, the air interface comprising the first and second radio resources;
determining whether the second data unit was obtained from the first radio resources or the second radio resources;
processing the second data unit without interference cancellation, when the determination indicates that the second data unit was obtained from the first radio resources; and
processing the second data unit using interference cancellation, when the determination indicates that the second data unit was obtained from the second radio resources.

11. The apparatus according to claim 9, wherein the at least one memory and the computer program code are configured to, with the at least one processor, cause the apparatus to further perform:
causing the radio resource to be partitioned, when interference in a cell is one of approaching an interference threshold level or has exceeded the interference threshold level.

12. The apparatus according to claim 9, wherein the at least one memory and the computer program code are configured to, with the at least one processor, cause the apparatus to further perform at least the following:
responsive to the delay requirement being less stringent than the delay threshold value, encoding the first data unit to be transmitted for interference cancellation at a receiver.

13. The apparatus according to claim 9, wherein obtaining the delay requirement pertaining to the first data unit comprises obtaining the delay requirement pertaining to one or more data packets belonging to an identified stream of packets.

14. The apparatus according to claim 9, wherein obtaining the delay requirement pertaining to the first data unit comprises deriving the delay requirement from a type of a data packet.

15. The apparatus according to claim 14, wherein deriving the delay requirement from the type of the data packet comprises assigning a low delay tolerance to data packets of at least one of control data packets, transmission control protocol acknowledgement packets, transmission control protocol synchronization packets, and voice over internet protocol packets.

16. The apparatus according to claim 9, wherein the at least one memory and the computer program code are configured to, with the at least one processor, cause the apparatus to further perform at least the following:
adapting the delay threshold value, when a change in traffic conditions occurs.

17. A non-transitory computer-readable storage medium encoded with instructions that, when executed by at least one processor, perform at least the following:
obtaining a first data unit received over an air interface, the air interface comprising first and second radio resources;
determining whether the first data unit was received over the first radio resources or the second radio resources;
processing the first data unit without interference cancellation responsive to a determination that the first data unit was received over the first radio resources, and
processing the first data unit with interference cancellation responsive to a determination that the first data unit was received over the second radio resources,
wherein the first and second radio resources are separated in at least one of a frequency domain, a time domain, and a space domain.

18. The non-transitory computer-readable storage medium according to claim 17, further comprising:
obtaining a second data unit to be transmitted;
obtaining a delay requirement pertaining to the second data unit;
causing the second data unit to be transmitted using first radio resources responsive to the delay requirement being more stringent than a delay threshold value; and
code for causing the second data unit to be transmitted using second radio resources responsive to the delay requirement being less stringent than the delay threshold value.

* * * * *